United States Patent [19]
Ferralli

[11] Patent Number: 5,814,371
[45] Date of Patent: *Sep. 29, 1998

[54] HOT MELT FLUIDIZED CLADDING OF INNERDUCT LINER WITH A LINER OF VARYING THICKNESS

[75] Inventor: Michael W. Ferralli, Fairview, Pa.

[73] Assignee: Technology Licensing Company, Pittsburgh, Pa

[ * ] Notice: The term of this patent shall not extend beyond the expiration date of Pat. No. 5,505,992.

[21] Appl. No.: 638,014

[22] Filed: Apr. 25, 1996

Related U.S. Application Data

[63] Continuation-in-part of Ser. No. 546,018, Oct. 20, 1995, Pat. No. 5,658,613, which is a continuation-in-part of Ser. No. 379,880, Jan. 27, 1995, Pat. No. 5,505,992.

[51] Int. Cl.$^6$ ........................................................ B05D 7/22
[52] U.S. Cl. .................... 427/236; 427/271; 427/314; 427/316; 427/356; 427/369; 427/385.5
[58] Field of Search ..................................... 427/229, 236, 427/314, 316, 369, 356, 393.5, 385.5, 274, 287, 271, 280

[56] References Cited

U.S. PATENT DOCUMENTS

| | | | |
|---|---|---|---|
| 4,786,525 | 11/1988 | Kayser | 427/236 |
| 4,892,442 | 1/1990 | Shoffner | 405/154 |
| 5,087,153 | 2/1992 | Washburn | 405/154 |

FOREIGN PATENT DOCUMENTS

93/14546  7/1993  WIPO.

OTHER PUBLICATIONS

"Coextrusion," Consise Encyclopedia of Polymer Processing & Applications, pp. 121–123 (No Date).
"Extruded Products," Handbook of Plastic Materials and Technology, pp. 1193–1195 (No Date).

*Primary Examiner*—Janyce Bell
*Attorney, Agent, or Firm*—Titus & McConomy LLP

[57] ABSTRACT

A conduit liner which is made by cladding the inner surface thereof with hot melt fluidized deposition thereon while the conduit is heated. Preferably, the fluidized deposition is of polymeric material which may include a low friction additive is deposited with varying thickness along the longitudinal axis of the conduit.

19 Claims, 2 Drawing Sheets

HOT MELT FLUIDIZED CLADDING OF INNERDUCT LINER WITH A LINER OF VARYING THICKNESS

CROSS REFERENCE

This is a continuation-in-part application of Ser. No. 08/546,018 filed Oct. 20, 1995, now U.S. Pat. No. 5,658,613 entitled "Hot Melt Fluidized Cladding of Innerduct Liner" which is a continuation-in-part application of Ser. No. 379,880 filed Jan. 27, 1995, now U.S. Pat. No. 5,505,992 entitled "Hot Melt Spray Cladding of Innerduct Liner."

FIELD OF INVENTION

The present invention relates to an improved conduit or innerduct and specifically to an improved conduit or innerduct for cable and method for applying a fluidized lining in an innerduct or cable conduit with a lubricous, low friction material in a pattern of varying thickness along the longitudinal axis of the conduit or innerduct.

BACKGROUND OF THE INVENTION

It is a well known practice to place telecommunication cable innerduct in conduit to protect the cable. Typically, the conduit is laid in place or an innerduct is placed within the conduit and the cable is pulled therethrough. The innerduct serves as a guide and protector for the fragile telecommunications cable. To reduce the friction encountered during the pulling operation, various methods of lining the interior of the innerduct have been attempted. Heretofore, a significant limitation of reducing the friction involved in pulling a telecommunication cable through an innerduct has been the economy and efficiency of lining the innerduct with a proper low friction, lubricous material.

Innerducts and some conduits are typically polymeric tubes manufactured by coextruding a thermoplastic polymer with a line or rope placed therein. This rope is subsequently used to pull the telecommunication cable through the innerduct or conduit. Considering that the innerduct or conduit may be manufactured in lengths of 5000 feet, the process of pulling the telecommunication cable can be quite difficult and potentially damaging to the cable itself if significant friction is encountered between the inner surface of the innerduct and the cable.

One method used to reduce the friction is to texture the inner surface in order to reduce contact points between the cable and inner surface and, thus, the overall friction. However, this method is limited by the intrinsic properties of the innerduct or conduit material, by the material's ability to accept a texture, and by the physical distortion of the texture caused during the cable pulling process.

Another method involves lining the innerduct with a low friction, lubricous liner which is coextruded with the innerduct, see for example U.S. Pat. No. 4,892,442. This method has the disadvantage that the coextrusion processes create unnecessarily thick liners. These liners are much thicker than the one-time cable pulling operation requires. Moreover, coextrusion is an inefficient way of lining shorter lengths of innerduct or conduit. The process is significantly inefficient in energy use since it involves melting a significant amount of the liner material prior to 'thick cross section' application.

Another method involves the application of lubrication agents to the inner surface of the innerduct or conduits, as disclosed in U.S. Pat. No. 5,087,153. This solution, however, is ineffective as well as troublesome since, during the pulling process, initial sections of the pulled-through cable tends to remove lubricating material for subsequent sections of the cable. The removal of the lubrication results in an increasing frictional gradient through the innerduct causing a potentially damaging stress gradient in the telecommunications cable. Furthermore, the use of lubricating materials to reduce the friction has a tendency to contaminate the telecommunications cable.

Accordingly, it is an object of this invention to overcome the limitations of the prior art methods and provide a method of lining an innerduct with a thin lubricous material which exhibits properties of low friction and ability to be textured in order to aid in the placement and reduce the pull-through force required to install telecommunications cable.

It is also an object of the present invention to provide an innerduct having an inner surface with a low coefficient of friction to facilitate pull-through of the cables. It is yet another object of this invention to provide a method of lining a duct with exceptionally thin lining material which will serve to reduce friction for the anticipated single pull-through process while simultaneously providing a material and energy efficient lining method.

It is another object of this invention to provide an innerduct liner which may be compounded with materials known for their low friction properties.

It is another object of this invention to provide an innerduct liner which is homogeneous such that surface wear of the liner will not result in exposure of a material displaying increased frictional properties.

It is another object of this invention to allow a thin liner material to be deposited with a textured surface in order to reduce surface contact with a telecommunication cable and thus decreased friction during pull-through.

It is another object of this invention to produce an innerduct liner by hot melt deposition of a polymer or other friction reducing material to the inner surface of an innerduct.

It is another object of this invention to provide a method of lining an innerduct or conduit which is adaptable to manufacture of both short and long lengths of innerduct or conduit.

It is another object of this invention to provide a method of lining an innerduct or conduit which may easily be altered to provide a lining property variability along an innerduct or conduit length.

SUMMARY OF THE INVENTION

Generally, the present invention provides a method for cladding the inner surface of an innerduct or conduit, especially polymeric conduit, which comprises the steps of applying a hot melt spray to the inner surface to form the clad inner liner. Preferably the spray comprises a lubricous, low friction polymer such as polyethylene, polytetrafluoroethylene, polyvinylidene fluoride or other material and may also include a mixture of pigments, stabilizers, lubrication fillers or agents or other additives. As used in this specification, the term "spray" refers to the method of applying a liquified material through a nozzle having at least one and preferably a plurality of nozzle openings and includes the method of "atomization", or particularizing, which is difficult to achieve with polymeric materials. The term includes both the continuous and discontinuous application of the material through the nozzle openings.

Preferably, the innerduct or conduit is heated to a temperature near the extrusion temperature of the innerduct or conduit. A material to be sprayed as the coating is fluidized, especially by liquefying, and then sprayed onto the inner surface of the innerduct to provide the clad inner surface.

It is preferred that a heated mandrel be used to contour the sprayed film on the inner surface. The mandrel is preferably heated to the fusion temperature of the coating. The contour can be grooves or other textures which provide a reduced contact area with the telecommunications cable thereby reducing frictional forces encountered during pull-through of the telecommunications cable.

The process of the present invention is distinguished from coextrusion which individual polymers flow through separate mandrel passages and are combined at the primary land area of the die. (Polymer Processing & Applications 1992.) In the method of the present invention, the nozzle is downstream of the extrusion die when the conduit is formed by extrusion.

In another embodiment of the invention, the effect of a mandrel can be achieved by using a spray nozzle which is juxtapositioned to the inner surface of the innerduct and by increasing the viscosity of the melt material. In this embodiment, it is possible to place a very thin coating on the inner surface which preferably varies in thickness along the longitudinal axis of the conduit. A continuous liner film of varying thickness that covers the inner surface of the conduit, or alternately a plurality of continuous or discontinuous liner strips of varying thickness can be formed by the spray nozzle. The thickness is varied by preferably varying the flow of the liner material as it is deposited from the spray nozzle. Alternately, the spray nozzle may be moved one, two or three-dimensionally with respect to the innerduct longitudinal axis while the conduit is extruded to create a liner of varying thickness along the innerduct longitudinal axis. Discontinuity can be created and varied by the placement of the nozzle openings and/or the use of a complimentary mandrel to form and configurize the coating into strips.

Other advantages of the invention will become apparent from a perusal of the following detailed description of a presently preferred embodiment of the invention taken in connection with the accompanying drawings.

PRESENTLY PREFERRED EMBODIMENT

Figure 1:
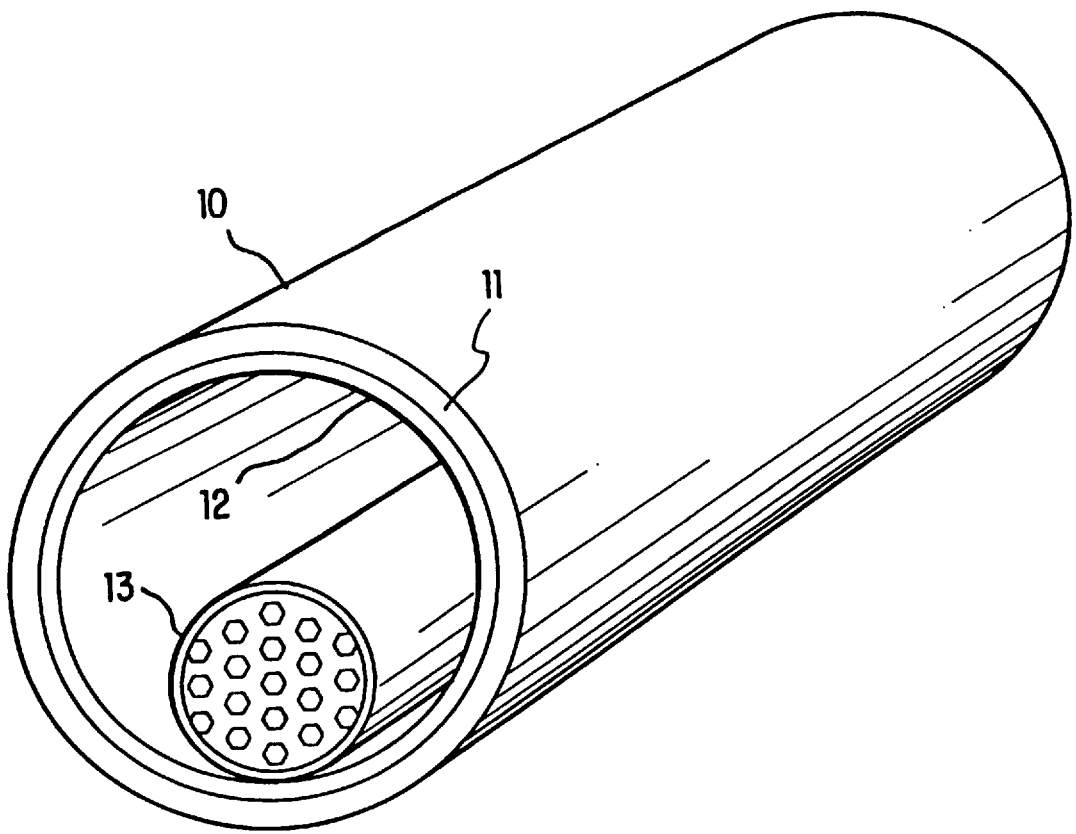
FIG. 1 is a perspective view of an innerduct or conduit formed in accordance with the present invention with a fiber optic telecommunications cable disposed therein.
Figure 4:
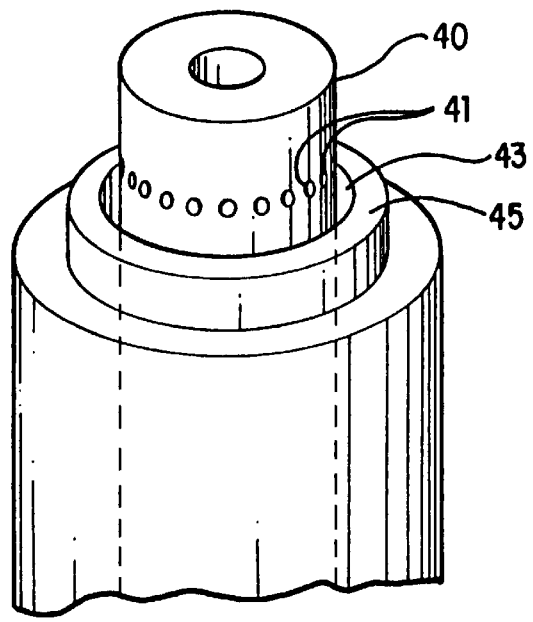
FIG. 4 is an elevation of the nozzle for use in an innerduct extruder for providing a plurality of ribbon-like lubricous coating strips.

Referring to FIG. 1, an innerduct or conduit 10 formed in accordance with the present invention is illustrated. Innerduct 10 consists of outer tube 11 which is a polymer, typically polypropylene and preferably formed by an extrusion process. Outer tube 11 has liner 12 which is formed by the hot melt spray enhanced deposition of a low friction, lubricous material from a nozzle located downstream of the extrusion die as shown in FIG. 4. The material to be deposited may be polymeric, and may contain agents and fillers which contribute to the lowering of the frictional properties of the liner when subjected to pull-through of telecommunications cable 13. Suitable material for the inner liner are polyethylene, polytetrafluoroethylene, polyvinylidene fluoride and like polymeric materials having a low coefficient of surface friction. Suitable friction-reducing fillers include graphite, silicone oils, polytetrafluoroethylene and the like.

Figure 2:
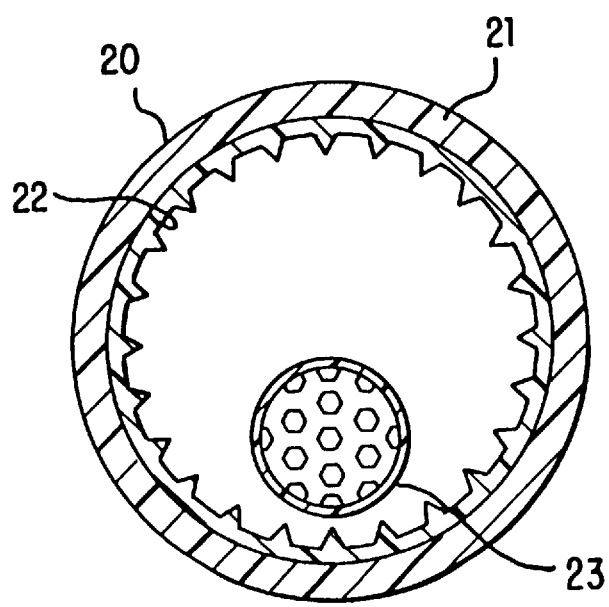
FIG. 2 is a cross sectional view of the innerduct or conduit formed in accordance with the present invention illustrating texture of the hot melt spray enhanced deposited liner.

Referring to FIG. 2, an innerduct 20 formed in accordance with the present invention is illustrated. The innerduct consists of a outer tube 21 which is a polymer formed by an extrusion process and has a textured liner 22 which is formed by the hot melt spray enhanced deposition of a low friction, lubricous material, which may be polymeric, and which may contain agents and fillers which contribute to the lowering of the frictional properties of the liner when subjected to pull-through of telecommunications cable 23. Suitable material for the inner liner would be polyethylene, polytetrafluoroethylene, polyvinylidene fluoride and the like. Where a polymeric material is used, it is not typically possible to create an atomized spray but a short-chained molecular spray is achievable at high temperatures.

Although FIGS. 1 and 2 illustrate a innerduct whose cross section is circular, it is to be understood that the innerducts 10 and 20 may have any desired cross sectional shape such a square, rectangular, elliptical, triangular or other required shape for desired end use. Further the textured liner 22 may be formed with undulations having inward projecting ribs whose cross sections which may take on any shape including, but not limited to, square, rectangular, circular, spiral and polygonal shapes.

Figure 3:
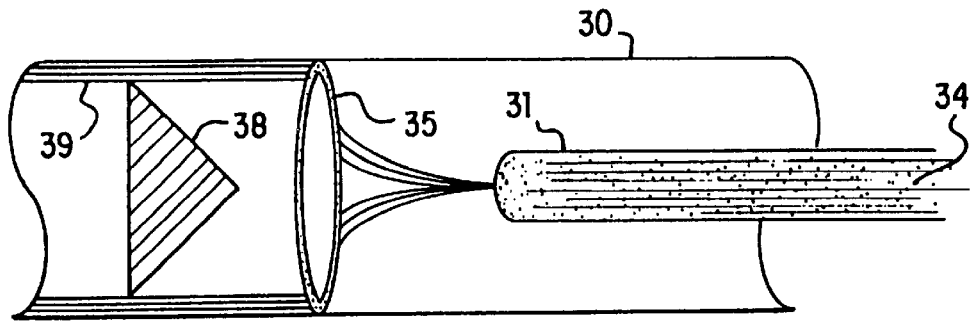
FIG. 3 is a schematic illustration of the preferred embodiment of the hot melt spray enhanced deposition process.

Referring to FIG. 3, a schematic illustrating a preferred embodiment of a process of forming the extruded innerduct with the hot melt spray enhanced deposition of a liner is shown. An innerduct or conduit 30, at or near its extrusion temperature has contained therein preferably before extrusion, an orificed tube or nozzle 31 containing fluidized material. Melted or otherwise liquified polymeric material 34 with or without filers is forced at high temperature through an orifice in nozzle 31 which dispenses the polymeric liner material 34 in a radially symmetric pattern 35 by a pump, such as a piston pump (not shown). Preferably pressures at or above 1500 psi are used to "atomize" the liner material to provide the spray coating. However, because of the polymeric nature of the preferred liner material it is generally not possible to obtain an atomized spray. In this application, the spray is generally as large as molecular fragmented polymer chains. The polymeric liner material 34 is adheringly deposited on the interior of innerduct 30 owing to the elevated temperature of the innerduct 30 as well as the liner material 34. Optimally, a heated plug 38 acts to further fuse the polymeric liner material, causing it to form a film 39. The heated plug 38 may optionally have a countered edge which is in contact with the polymeric film 39, thereby contouring it with a desired texture.

The thickness of the liner film 39 can be made to vary along the longitudinal axis of innerduct 30 to minimize the friction encountered by the telecommunication cable as it is pulled along the longitudinal axis of the innerduct 30. Preferably, the thickness of the film 39 is varied by varying the discharge flow of the liner material 34 from the spray nozzle 31. The thickness of the film 39 will be greatest in areas where the nozzle 31 discharge flow is at its maximum value. Conversely, the thickness of the film 39 will be minimized in areas where the nozzle 31 discharge flow is at its lowest value. The range of nozzle 31 discharge flow variation or alternately the extrusion rate of the innerduct 30 can be used to control the maximum and minimum thickness of the liner film 39. A film 39 thickness pattern that varies along the longitudinal axis but not around the cross-section of the innerduct 30 can be produced when the nozzle 31 orifice lies in a plane perpendicular to the longitudinal axis of the innerduct 30. Conversely, a film 39 thickness pattern that varies along both the longitudinal axis and around the cross-section of the innerduct 30 can be produced if the nozzle 31 orifice lies in skewed relationship to the innerduct 30 longitudinal axis. A pattern of varying film 39 thickness that is periodic will be produced if the nozzle 40 flow variation is periodic. Conversely, a non-periodic variation in film 39 thickness will be produced if the nozzle 31 flow variation is not periodic.

Alternately, the thickness of the film 39 can be varied by moving the spray nozzle 31 in a in a one, two or three dimensional pattern while the innerduct 30 is extruded to cause the spray nozzle 31 to pass through the innerduct 30 interior. The thickness of the film 39 will be maximized when the film 39 is deposited in areas where the relative motion of the nozzle 31 and the innerduct 30 is in the same direction. Conversely, the thickness of the film 39 will be minimized when the film 39 is deposited in areas where the relative motion of the nozzle 31 and the innerduct 30 is in the opposite direction. The movement speed of the spray nozzle 31 or alternately the extrusion rate of the innerduct 30 may be varied to control the minimum and maximum thickness of the film 39. The movement of the spray nozzle 31 may be accomplished by any mechanical or electromechanical method known in the state of the art, such as by the use of an electrically actuated piston attached to the spray nozzle 31. The thickness of the film 39 will vary along the longitudinal axis but not around the cross-section of the innerduct 30 when the nozzle 31 movement is one dimensionally parallel to the longitudinal axis of the innerduct 30. The thickness of the film 39 will vary both along the longitudinal axis and around the cross-section of the innerduct 30 if the nozzle 31 movement is either two dimensional or three dimensional with one dimension being parallel to the innerduct 30 longitudinal axis. A pattern of varying film 39 thickness that is periodic will be produced if the movement of the nozzle 31 is periodic. Conversely, a non-periodic variation in film 39 thickness will be produced if the movement of the nozzle 31 is not periodic.

Thus using either nozzle 31 flow variation or movement a textured film 39 may be formed with undulations having inward projecting ribs whose cross sections which may take on any shape including, but not limited to periodic shapes such as square, rectangular, circular, spiral and polygonal shapes.

Figure 5:
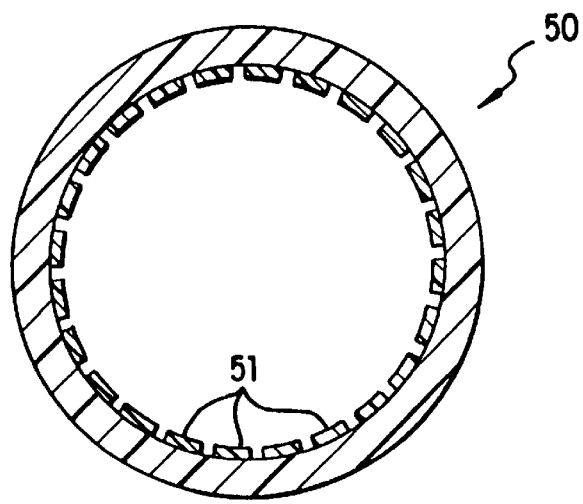
FIG. 5 is a cross-sectional view of the innerduct or conduit formed in accordance with the present invention illustrating the texture of the hot melt spray enhanced deposited liner strips.

In another embodiment, the polymeric liner material with or without fillers is deposed on the inner surface of the innerduct in the form of a plurality of strips which may be continuous or discontinuous. One preferred method of depositing the coating is the use of a spray nozzle 40, FIG. 4, which includes a plurality of nozzle openings 41. Nozzle 40 is located downstream of the extrusion die at a distance close enough to take advantage of the temperature of the extruded conduit. The openings 41 are preferably sized larger than those used in a liquified melt spray so that a more viscous liner material can be used. Nozzle 40 is positioned within an extrusion tube 45 such that an extruded innerduct passes between nozzle 40 and tube 45 through annular opening 44. Preferably nozzle 40 is positioned sufficiently close to the extrusion mandrel so that the temperature of the extruded innerduct has not cooled sufficiently. Optimally, the temperature of the liner material is just below the extrusion temperature of the innerduct. Referring to FIGS. 4 and 5, a pressure of from 1000 to 1500 psi has been found suitable for deposit spraying a plurality of lubricous coating strips 51 on the surface of innerduct 50 using nozzle 40. In this embodiment, strips 51 are discontinuous to minimize the amount of material needed, but the strip 51 thickness is sufficient to facilitate and support the fiber optics or telecommunication cable as it is pulled through.

As with the embodiment in which a continuous film is created, the thickness of the liner strips 51 can be made to vary along the longitudinal axis of innerduct 50 to minimize the friction encountered by the telecommunication cable as it is pulled along the longitudinal axis of the innerduct 50. Preferably, the thickness of the strips 51 is varied by varying the discharge flow of the liner material from the spray nozzle 40. The thickness of the strips 51 will be greatest in areas where the nozzle 40 discharge flow is at its maximum value. Conversely, the thickness of the strips 51 will be minimized in areas where the nozzle 40 discharge flow is at its lowest value. The range of nozzle 40 discharge flow variation or alternately the extrusion rate of the innerduct 50 can be used to control the maximum and minimum thickness of the liner strips 51. A thickness pattern that varies along the longitudinal axis but not around the cross-section of the innerduct 50 when the nozzle openings 41 lie in a plane perpendicular to the longitudinal axis of the innerduct 50. Conversely, a thickness pattern can be produced that varies along both the longitudinal axis and around the cross-section of the innerduct 50 if the nozzle openings 41 lie in skewed relationship to one another with respect to the innerduct 50 longitudinal axis. A pattern of varying thickness that is periodic will be produced if the nozzle 40 flow variation is periodic. Conversely, a non-periodic variation in thickness will be produced if the movement of the nozzle 40 flow variation is not periodic.

Alternately, the thickness of the strips 51 can be varied by moving the spray nozzle 40 in a in a one, two or three dimensional pattern while the innerduct 50 is extruded to cause the spray nozzle 40 to pass through the innerduct 50 interior. The thickness of the strips 51 will be maximized when the strips 51 is deposited in areas where the relative motion of the nozzle 40 and the innerduct 50 is in the same direction. Conversely, the thickness of the strips 51 will be minimized when the strips 51 is deposited in areas where the relative motion of the nozzle 40 and the innerduct 50 is in the opposite direction. The movement speed of the spray nozzle 40 or alternately the extrusion rate of the innerduct 50 may be varied to control the minimum and maximum thickness of the strips 51. The movement of the spray nozzle 40 may be accomplished by any mechanical or electromechanical method known in the state of the art, such as by the use of an electrically actuated piston attached to the spray nozzle 40. The thickness of the film will vary along the longitudinal axis but not around the cross-section of the innerduct 50 when the nozzle 40 movement is one dimensionally parallel to the longitudinal axis of the innerduct 50. The thickness of the film will vary both along the longitudinal axis and around the cross-section of the innerduct 50 if the nozzle 40 movement is either two dimensional or three dimensional with one dimension being parallel to the innerduct 50 longitudinal axis. A pattern of varying thickness that is periodic will be produced if the movement of the nozzle 40 is periodic. Conversely, a non-periodic variation in thickness will be produced if the movement of the nozzle 40 is not periodic.

Thus as is the case with the embodiment in which a continuous film is created, nozzle 40 flow variation or movement can be used to form textured strips 51 with undulations having inward projecting ribs whose cross sections which may take on any shape including, but not limited to periodic shapes such as square, rectangular, circular, spiral and polygonal shapes.

While the invention has been described in connection with what is presently considered to be the preferred embodiment, it is to be understood the invention is not to be limited to the disclosed embodiments, but on the contrary is intended to cover various modifications and equivalent arrangements include within the spirit of the scope of the appended claims.

What is claimed is:

1. A method of cladding the inner surface of an innerduct or conduit, said method comprising the steps of:
   a. fluidizing a lubricous polymeric material to be deposited on said inner surface;
   b. heating the conduit to a temperature less than the melting point of said polymeric material and innerduct or conduit;
   c. depositing the fluidized material through a nozzle on said inner surface in a direction along the longitudinal axis of said conduit to provide a coating thereover.

2. A method as set forth in claim 1 wherein said polymeric material is deposited by spraying.

3. A method as set forth in claim 1 wherein said polymeric material is deposited in a film covering said inner surface.

4. A method as set forth in claim 1 wherein said innerduct or conduit is a thermoplastic polymer formed by extrusion.

5. A method as set forth in claim 4 including the steps of mixing said polymer with materials chosen from a group consisting of graphite and silicone oils.

6. A method according to claim 1 wherein said polymeric material consists of a low friction polymer chosen from a group consisting of polyethylene, polytetrafluoroethylene, polyvinylidene fluoride, and mixtures of said polymers.

7. A method according to claim 1 wherein said polymeric material is filled with a powder chosen from a group consisting of graphite, talc and silicone.

8. A method of cladding the inner surface of an innerduct or conduit, said method comprising the steps of:
   a. fluidizing a polymeric material to be deposited on said inner surface:
   b. depositing the fluidized material through a nozzle on said inner surface in a direction along the longitudinal axis of said conduit to provide a coating thereover,
wherein said polymeric material is deposited in a plurality of juxtaposed strips extending substantially the length of said innerduct or conduit.

9. A method of cladding the inner surface of an innerduct or conduit, said method comprising the steps of:
   a. fluidizing a polymeric material to be deposited on said inner surface;
   b. depositing the fluidized material through a nozzle on said inner surface in a direction along the longitudinal axis of said conduit to provide a coating thereover,
wherein said inner surface coating is imparted with textured surface by means of a heated plug spaced apart from said nozzle.

10. A method of cladding the inner surface of an innerduct or conduit, said method comprising the steps of:
    a. fluidizing a polymeric material to be deposited on said inner surface:
    b. depositing the fluidized material through a nozzle on said inner surface in a direction along the longitudinal axis of said conduit to provide a coating thereover,
wherein said polymeric material is nonuniformly sprayed to a surface of said conduit to form a surface clad of non uniform thickness.

11. A method of cladding the inner surface of an innerduct or conduit, said method comprising the steps of:
    a. fluidizing a polymeric material to be deposited on said inner surface;
    b. depositing the fluidized material through a nozzle on said inner surface in a direction along the longitudinal axis of said conduit to provide a coating thereover,
wherein the thickness of said coating is varied by moving said nozzle.

12. A method of cladding the inner surface of an innerduct or conduit, said method comprising the steps of:
    a. fluidizing a polymeric material to be deposited on said inner surface;
    b. depositing the fluidized material through a nozzle on said inner surface in a direction along the longitudinal axis of said conduit to provide a coating thereover,
wherein the thickness of said coating is varied by adjusting the flow of said material through said nozzle.

13. A method of cladding the inner surface of an innerduct or conduit, said method comprising the steps of:
    a. fluidizing a polymeric material to be deposited on said inner surface;
    b. heating the conduit to a temperature less than the melting point of said polymeric material and innerduct or conduit;
    c. depositing the fluidized material through a nozzle on said inner surface in a direction along the longitudinal axis of said conduit to provide a coating thereover,
wherein said polymeric material is deposited in a plurality of juxtaposed strips extending substantially the length of said innerduct or conduit.

14. A method of cladding the inner surface of an innerduct or conduit, said method comprising the steps of:
    a. fluidizing a polymeric material to be deposited on said inner surface;
    b. heating the conduit to a temperature less than the melting point of said polymeric material and innerduct or conduit;
    c. depositing the fluidized material through a nozzle on said inner surface in a direction along the longitudinal axis of said conduit to provide a coating thereover,
wherein said inner surface coating is imparted with textured surface by means of a heated plug spaced apart from said nozzle.

15. A method of cladding the inner surface of an innerduct or conduit, said method comprising the steps of:
    a. fluidizing a polymeric material to be deposited on said inner surface;
    b. heating the conduit to a temperature less than the melting point of said polymeric material and innerduct or conduit;
    c. depositing the fluidized material through a nozzle on said inner surface in a direction along the longitudinal axis of said conduit to provide a coating thereover,
wherein said polymeric material is nonuniformly sprayed to a surface of said conduit to form a surface clad of non uniform thickness.

16. A method of cladding the inner surface of an innerduct or conduit, said method comprising the steps of:
    a. fluidizing a polymeric material to be deposited on said inner surface;
    b. heating the conduit to a temperature less than the melting point of said polymeric material and innerduct or conduit;

c. depositing the fluidized material through a nozzle on said inner surface in a direction along the longitudinal axis of said conduit to provide a coating thereover, wherein the thickness of said coating is varied by moving said nozzle.

17. The method of claim 11 or 16, wherein said movement selected from one of oscillatory, non-oscillatory or random.

18. A method of cladding the inner surface of an innerduct or conduit, said method comprising the steps of:

a. fluidizing a polymeric material to be deposited on said inner surface;

b. heating the conduit to a temperature less than the melting point of said polymeric material and innerduct or conduit;

c. depositing the fluidized material through a nozzle on said inner surface in a direction along the longitudinal axis of said conduit to provide a coating thereover, wherein the thickness of said coating is varied by adjusting the flow of said material through said nozzle.

19. The method of claim 12 or 18, wherein said adjustment is selected from one of oscillatory, non-oscillatory or random.

* * * * *